(No Model.)
S. E. PRANKE.
COMBINATION TAP AND DIE.
No. 574,216. Patented Dec. 29, 1896.
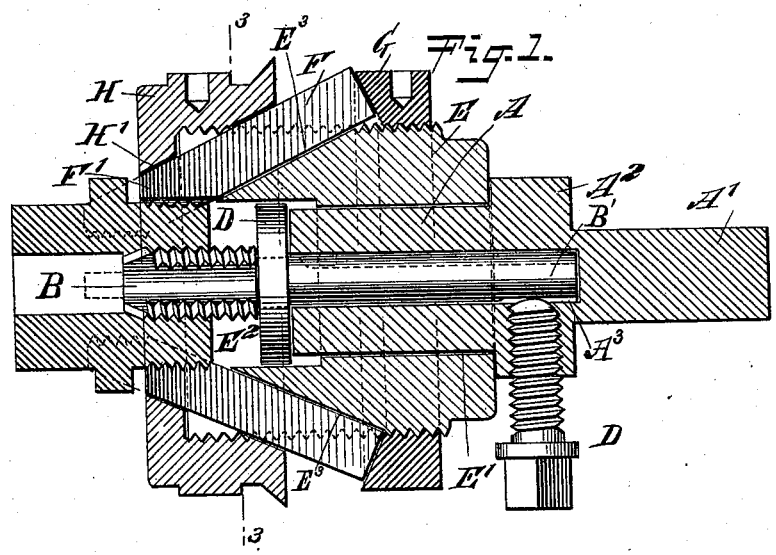
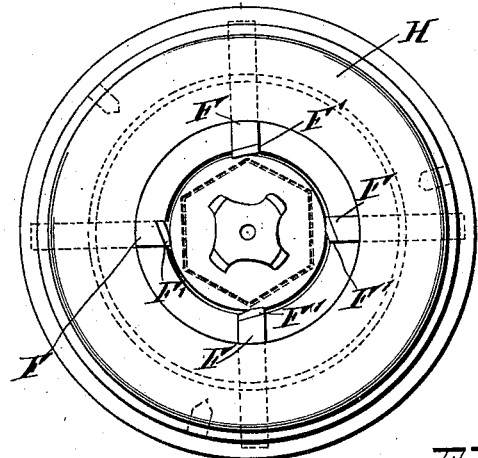
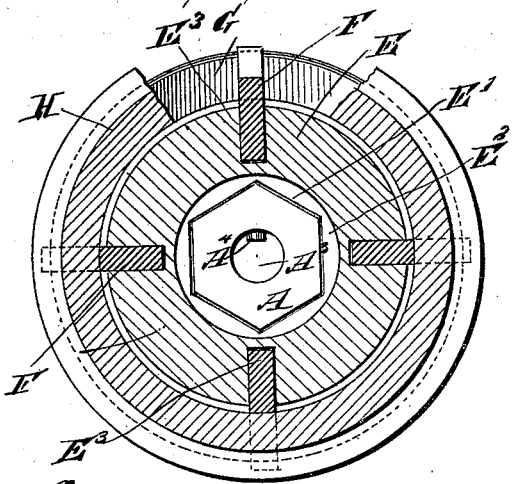
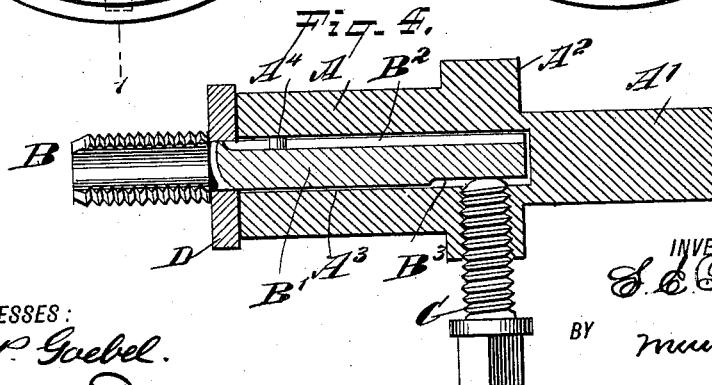
WITNESSES:
William P. Goebel.
Theo. G. Hoster.
INVENTOR
S. E. Pranke.
BY
ATTORNEYS.

UNITED STATES PATENT OFFICE.

STEPHEN E. PRANKE, OF BUCHANAN, VIRGINIA.

COMBINATION TAP AND DIE.

SPECIFICATION forming part of Letters Patent No. 574,216, dated December 29, 1896.

Application filed September 8, 1896. Serial No. 605,138. (No model.)

*To all whom it may concern:*

Be it known that I, STEPHEN E. PRANKE, of Buchanan, in the county of Botetourt and State of Virginia, have invented a new and Improved Combination Tap and Die, of which the following is a full, clear, and exact description.

The invention relates to metallic working tools; and its object is to provide a new and improved combination tap and die which is simple and durable in construction, very effective in operation, and arranged to conveniently, quickly, and simultaneously cut both external and internal threads on spuds, pipes, and other articles, the arrangement being such that the cutters can be conveniently changed for work of larger or smaller diameters.

The invention consists of certain parts and details and combinations of the same, as will be fully described hereinafter and then pointed out in the claims.

Reference is to be had to the accompanying drawings, forming a part of this specification, in which similar characters of reference indicate corresponding parts in all the figures.

Figure 1 is a sectional side elevation of the improvement on the line 1 1 of Fig. 2. Fig. 2 is a front end elevation of the same. Fig. 3 is a cross-section of the same on the line 3 3 of Fig. 1 and with the tap removed, and Fig. 4 is a sectional side elevation of the tap and the means for fastening the same in the holder.

The combination tap and die is provided with a tap-holder A, having a polygonal cross-section and formed at its rear end with a spindle A', adapted to be fastened in the socket of the lathe or other machine on which the tool is to be used. A collar $A^2$ is formed on the holder to abut against the outer end of the socket or other device engaging and holding the spindle A'.

The tap-holder is provided with a central longitudinally-extending recess $A^3$, adapted to receive the shank B' of a tap B, formed in its shank, with a longitudinally-extending groove $B^2$ engaging a lug $A^4$, secured to the tap-holder and projecting in the recess $A^3$, as plainly shown in the drawings. A set-screw C, screwing in the collar $A^2$ of the tap-holder, engages a flat portion of the shank B', so as to securely fasten the latter, and consequently the tap, in place in the holder A. The tap B preferably rests with its inner face against a washer D, of any desired thickness, to bring the tap to the proper position in a collet or holder E, according to the nature of the work.

The polygonal tap-holder A fits into a correspondingly-shaped opening E, formed centrally in the rear end of the collet or holder E, the front end being formed with a circular bore $E^2$ concentric to the opening E' and sufficiently large to permit the entrance of the spud, pipe, or other article under treatment, so that the tap can internally thread the article while the external thread is cut by the teeth F' of chasers F, made in the shape of longitudinally-extending bars fitted to slide in angular guideways $E^3$, formed in the front end of the collet E. The teeth F' stand at an angle to the longitudinal line of the bar and always parallel with the axis of the collet E, as plainly indicated in Fig. 1, the teeth extending into the bore $E^2$ to engage the external surface of the spud or other article, so as to cut the threads thereon at the time the tap B cuts an internal thread.

The heels of the chasers F abut against a collar G, screwing on the rear end of the collet, and when the said chasers are adjusted in place they are locked in the proper position by a locking-collar H, screwing on the front end of the collet E. The locking-collar H is formed with a conical opening fitting upon the top edges of the chasers F, so that when the collar H is screwed up the chasers are engaged at their top edges by the wall of the said conical opening H' to securely fasten the chasers in their guideways.

By the arrangement described it is evident that when the tap-holder A is rotated the collet E is rotated with it, and consequently the tap B, as well as the chasers F, act simultaneously on the article fed into the bore $A^2$, so that internal as well as external threads are cut on the article.

For work of different diameters it is necessary to use different-sized taps B and to adjust the chasers F by screwing up the threaded collar G to move the said chasers F farther inward or outward, according to the diameter of the article to be threaded.

Having thus fully described my invention,

I claim as new and desire to secure by Letters Patent—

1. A combination tap and die, comprising a holder adapted to carry a tap, a collet having its rear end shaped to fit on the said holder, and having its front end formed with a circular bore adapted to receive the article to be treated and into which extends the said tap, and inclined guideways formed on the said collet and adapted to receive thread-cutting chasers the said thread-cutting chasers being arranged concentric to the said tap, and the collet and tap being adapted to rotate together, whereby internal and external threads are simultaneously cut on the article under treatment, substantially as shown and described.

2. A combination tap and die, comprising a holder adapted to carry a tap, and a collet having a central opening in its rear end shaped to fit the said holder, the front end of the said collet being formed with a circular bore into which extends the said tap, the said collet rotating with the said tap-holder and carrying thread-cutting chasers, substantially as shown and described.

3. A combination tap and die, comprising a holder formed at its rear with a spindle and provided with a central longitudinally-extending recess, a tap provided with a shank adapted to engage the said recess, a washer held between the inner face of the tap and the front end of the said holder, and a collet held on and rotating with the said tap-holder, and carrying thread-cutting chasers, substantially as shown and described.

4. A combination tap and die, comprising a revoluble holder formed with a central longitudinally-extending recess and having a lug projecting into the said recess, a tap provided with a shank adapted to engage the said recess, the said shank being formed with a longitudinally-extending groove adapted to engage the said lug, means for fastening the shank in place in the holder, a collet fitted on and rotating with the said tap-holder and formed at its front end with a central circular bore adapted to receive the article to be treated and into which extends the said tap, the said collet being provided with a thread-cutting device, the teeth of which extend into the said bore, substantially as shown and described.

5. A combination tap and die, comprising a revoluble holder having a polygonal cross-section and formed with a central longitudinally-extending recess adapted to receive the shank of a tap, a collet having a corresponding polygonal-shaped opening formed centrally in its rear end, and adapted to fit on the said tap-holder, the front end of said collet being formed with a circular bore concentric with the polygonal-shaped opening and into which extends the said tap, thread-cutting chasers carried by the said collet, the teeth of which extend into the said bore, and means for holding the said chasers in position on the collet after proper adjustment is made, the said tap-holder and collet being arranged to rotate together, whereby the tap and chasers act simultaneously on the article fed into the circular bore of the collet to cut internal and external threads thereon, as set forth.

STEPHEN E. PRANKE.

Witnesses:
WM. R. BEALE,
JAMES L. GARLAND.